(12) United States Patent
Mashiko et al.

(10) Patent No.: US 10,715,004 B2
(45) Date of Patent: Jul. 14, 2020

(54) WIRING COMPONENT (71) Applicant: Hitachi Metals, Ltd., Tokyo (JP)

(72) Inventors: Shinsuke Mashiko, Tokyo (JP); Kenichi Egami, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/531,875

(22) Filed: Aug. 5, 2019

(65) Prior Publication Data

US 2020/0052540 A1  Feb. 13, 2020

(30) Foreign Application Priority Data

Aug. 10, 2018  (JP) ................. 2018-151702

(51) Int. Cl.
*H01B 7/40* (2006.01)
*H02K 3/50* (2006.01)
*H01R 11/12* (2006.01)

(52) U.S. Cl.
CPC ................. *H02K 3/50* (2013.01); *H01B 7/40* (2013.01); *H01R 11/12* (2013.01)

(58) Field of Classification Search
CPC ...... H02K 3/50; H01R 13/5816; H01R 11/12; H01R 13/585; H01R 13/5845; H01R 13/582; H01R 4/70; H01B 7/40; H01B 7/24; H01B 7/02; H01B 7/0045; H01B 3/46; H01B 3/441; H01B 3/423; H01B 3/305; H02G 3/0658; H02G 3/0625; H02G 1/14; B60R 16/0207
See application file for complete search history.

(56) References Cited

U.S. PATENT DOCUMENTS

| | | | | |
|---|---|---|---|---|
| 5,414,218 A | * | 5/1995 | Nathan | H01R 13/5816 174/140 R |
| 5,466,173 A | * | 11/1995 | Down | H01R 9/0518 439/578 |
| 2004/0060723 A1 | * | 4/2004 | Pallapothu | B60R 16/0222 174/653 |
| 2005/0170707 A1 | * | 8/2005 | Matsumura | H01H 85/044 439/874 |
| 2014/0144697 A1 | * | 5/2014 | Sekido | A61B 1/0011 174/70 R |
| 2014/0318862 A1 | * | 10/2014 | Tachi | H01R 43/005 174/75 R |
| 2018/0336979 A1 | * | 11/2018 | Nakashima | H01B 3/423 |

FOREIGN PATENT DOCUMENTS

JP  2011-259654 A  12/2011

* cited by examiner

*Primary Examiner* — Steven T Sawyer
(74) *Attorney, Agent, or Firm* — Roberts Calderon Safran & Cole P.C.

(57) ABSTRACT

A wiring component includes a conductive wire including a single wire, and a holding member that covers a part of the conductive wire in a longitudinal direction to hold the conductive wire. The conductive wire includes at least one recessed portion formed on the covered part thereof, and the conductive wire is prevented from longitudinally moving relative to the holding member by an engagement between the recessed portion and a portion of the holding member filled in the recessed portion.

8 Claims, 5 Drawing Sheets

WIRING COMPONENT

CROSS-REFERENCE TO RELATED APPLICATIONS

The present application is based on Japanese patent application No. 2018-151702 filed on Aug. 10, 2018, the entire contents of which are incorporated herein by reference.

TECHNICAL FIELD

The invention relates to a wiring component in which a conductive wire formed of a single wire is held by a holding member formed of a resin.

RELATED ART

Wiring component having plural conductive wires held by a holding member is sometimes used to connect, e.g., end portions of windings of a motor to a terminal block.

A fixing member attached at the middle of three power lines is disclosed in JP 2011/259654 A (see paragraphs 0038 to 0043 and FIGS. 3 and 4). This fixing member is a member for fixing the power lines to each other and restricting the motor from moving in a circumferential direction of a stator, and has a bar shape curving along the circumferential direction of the stator. Three through-holes for respectively inserting the power lines are formed on the fixing member. Before being welded to coil terminals of the stator, the power lines are inserted into the through-holes and attached to the fixing member.

SUMMARY OF INVENTION

The fixing member disclosed in JP 2011/259654 A may cause the power lines to move along the longitudinal direction thereof relative to the fixing member.

It is an object of the invention to provide a wiring component that includes a holding member to hold a conductive wire such that the conductive wire can be prevented from moving along the longitudinal direction thereof relative to the holding member.

According to one aspect of the invention, a wiring component comprises:

a conductive wire comprising a single wire; and a holding member that covers a part of the conductive wire in a longitudinal direction to hold the conductive wire,
  wherein the conductive wire comprises at least one recessed portion formed on the covered part thereof, and
  wherein the conductive wire is prevented from longitudinally moving relative to the holding member by an engagement between the recessed portion and a portion of the holding member filled in the recessed portion.

Effects of Invention

According to an embodiment of the invention, a wiring component can be provided that includes a holding member to hold a conductive wire such that the conductive wire can be prevented from moving along the longitudinal direction thereof relative to the holding member.

BRIEF DESCRIPTION OF DRAWINGS

FIGS. 6A and 6B show a wiring component in the second embodiment of the invention, wherein

DESCRIPTION OF EMBODIMENTS

First Embodiment

Figure 1:
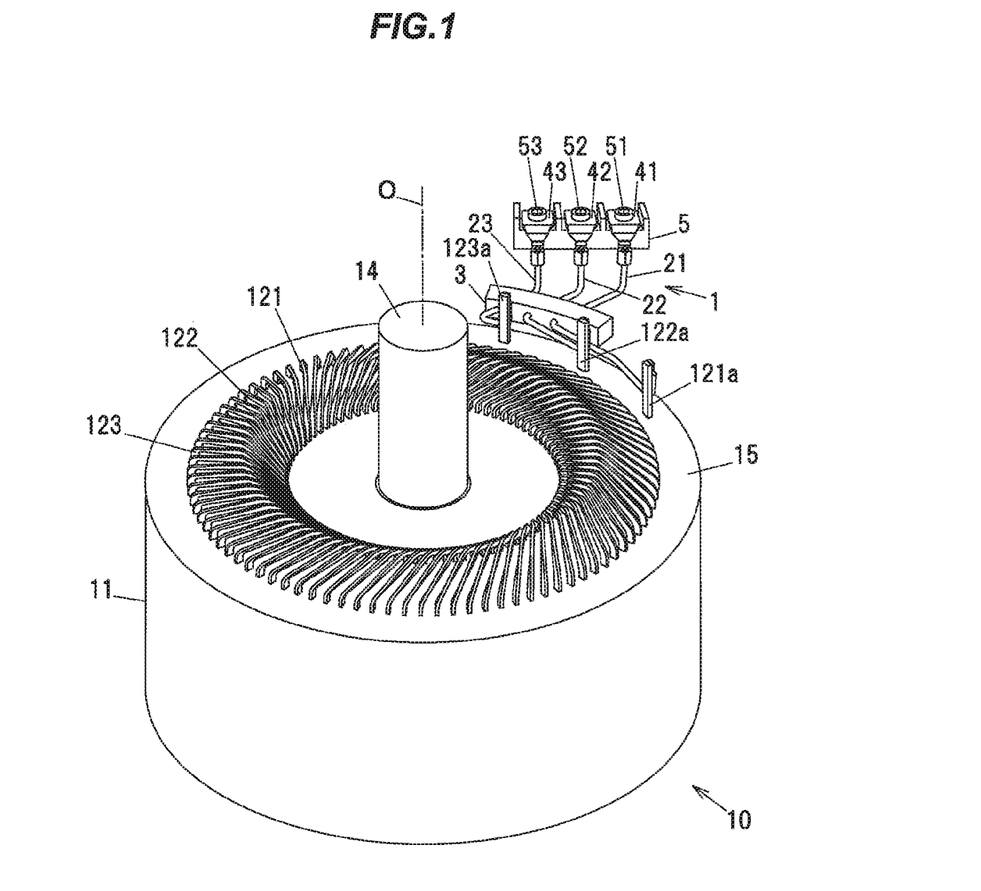
FIG. 1 is a perspective view showing a wiring component in the first embodiment of the present invention and a three-phase motor.
Figure 2A:
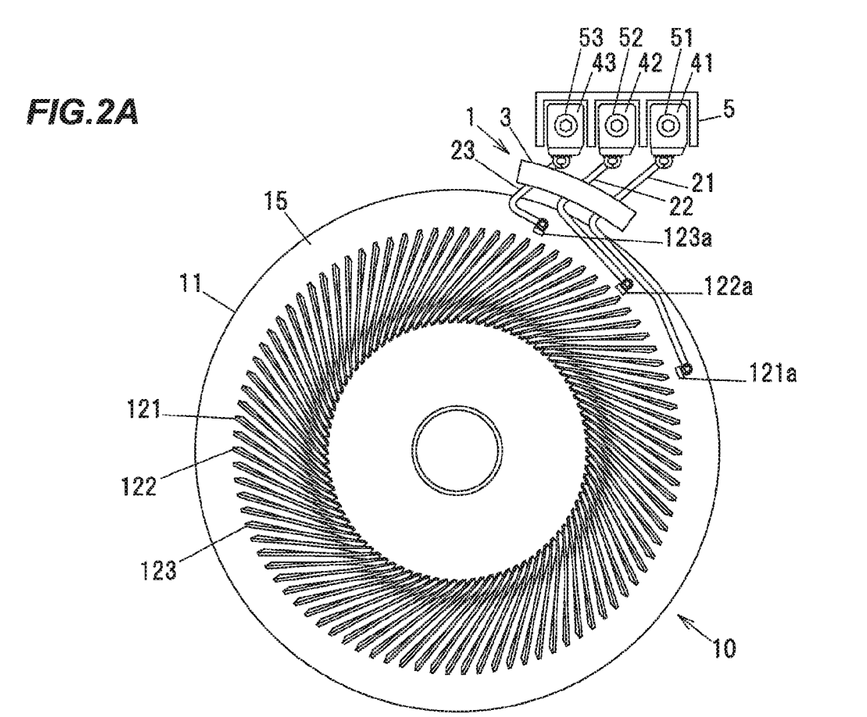
FIG. 2A is a plan view showing the wiring component and the three-phase motor.
Figure 2B:
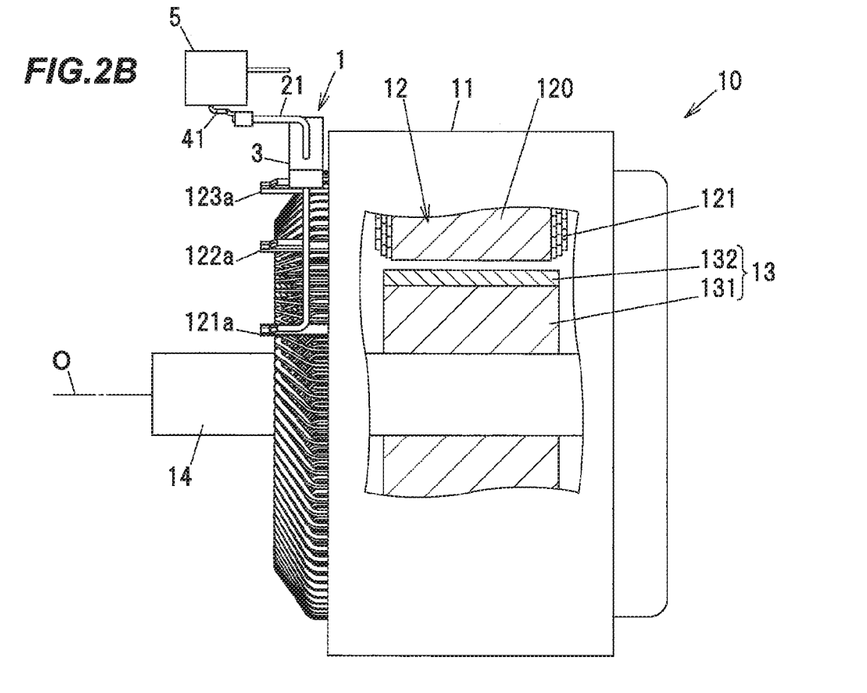
FIG. 2B is a side view showing the wiring component and the three-phase motor.

FIG. 1 is a perspective view showing a wiring component 1 in the first embodiment of the invention and a three-phase motor 10 which is supplied with an electric current through the wiring component 1. FIG. 2A is a plan view showing the wiring component 1 and the three-phase motor 10 and FIG. 2B is a side view showing the wiring component 1 and the three-phase motor 10. In FIG. 2B, a portion of the three-phase motor 10 is cutaway to show the internal structure thereof.

The three-phase motor 10 is mounted on, e.g., a vehicle to serve as a drive source of the vehicle, and is supplied with three-phase AC currents from an inverter (not shown) via a terminal block 5 and the wiring component 1.

The three-phase motor 10 has a closed-end cylindrical motor case 11, a stator 12 housed in the motor case 11, a rotor 13 arranged inside the stator 12, a shaft 14 penetrating the center of the rotor 13 and supported so as to be integrally rotatable with the rotor 13, and a lid member 15 formed of a molding resin and covering an opening of the motor case H.

In the stator 12, U-, V- and W-phase windings 121 to 123 are wound on an annular stator core 120 which surrounds the rotor 13. In more detail, the stator core 120 is provided with plural teeth on each of which one of the U-, V- and W-phase windings 121 to 123 is wound. The stator core 120 is formed of a magnetic material such as steel. Each of the windings 121 to 123 is a rectangular insulated wire in which an insulating cover layer formed of enamel is provided on an outer peripheral surface of a conductor formed of copper. The windings 121 to 123 are molded in the lid member 15 so as to be partially exposed to the outside of the motor case 11 from the lid member 15.

The rotor 13 has a cylindrical rotor core 131 having a through-hole for inserting the shaft 14, and a magnet 132 arranged around the rotor core 131. The magnet 132 has plural magnetic poles such that S poles and N poles are located alternately. The shaft 14 is supported on the motor case 11 by a shaft bearing (not shown) so as to be rotatable about a rotational axis O.

Figure 3:
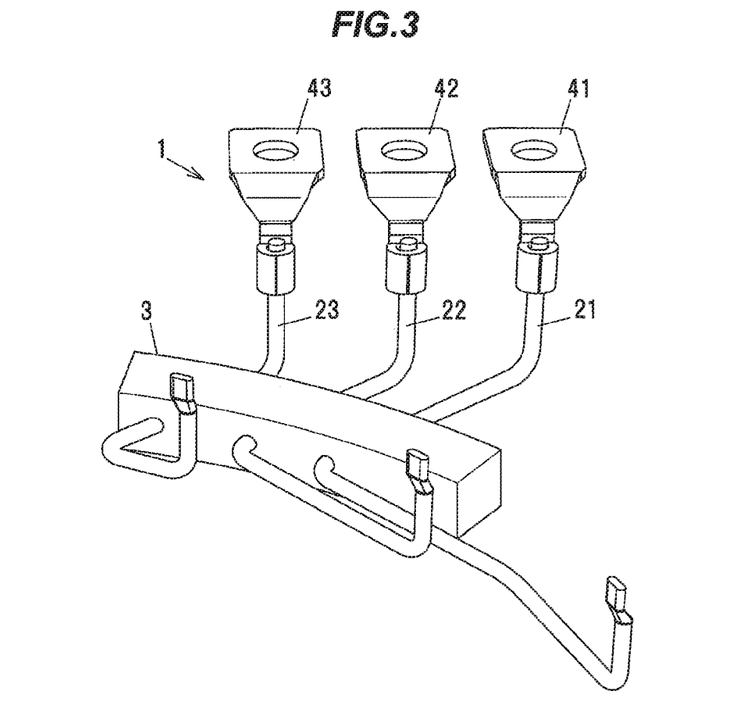
FIG. 3 is a perspective view showing the wiring component.

FIG. 3 is a perspective view showing the wiring component 1. The wiring component 1 is provided with first to third conductor wires 21 to 23 respectively corresponding to the U-, V- and W-phases, a resin holding member 3 for holding the first to third conductor wires 21 to 23, and first to third connecting terminals 41 to 43 to be connected to the terminal: block 5.

The first conductor wire 21 is arranged such that one end is connected to the U-phase winding 121 and another end is connected to the terminal block 5. The second conductor wire 22 is arranged such that one end is connected to the V-phase winding 122 and another end is connected to the terminal block 5. The third conductor wire 23 is arranged such that one end is connected to the W-phase winding 123 and another end is connected to the terminal block 5. Although the respective other ends of the first to third conductor wires 21 to 23 are connected to the terminal block 5 via the first to third connecting terminals 41 to 43 in the first embodiment, it is not limited thereto. For example, the first to third conductor wires 21 to 23 may be directly connected to the terminal block 5 by bending end portions on the terminal block 5 side into an arc or annular shape.

The terminal block 5 has plural (three) washers (not shown), and the first to third connecting terminals 41 to 43 are respectively fixed to the washers by bolts 51 to 53 (see FIGS. 1 and 2). The terminal block 5 is fixed to a vehicle body by a fixing member (not shown) and the washers are electrically connected to output terminals of the inverter through a wire harness.

Each of the first to third conductor wires 21 to 23 is formed of a stiff single wire and has a circular shape in a cross section perpendicular to the longitudinal direction thereof. In addition, the first to third conductor wires 21 to 23 are each formed by covering a metal conductor formed of copper with an insulation such as enamel, and the metal conductor is exposed at both ends by removing the insulation.

The first to third conductor wires 21 to 23 are connected to the windings 121 to 123 by welding. To facilitate connection to the windings 121 to 123, the first to third linear conductors 21 to 23 are flattened from a circular cross-sectional shape into a rectangular cross-sectional shape at one end to be welded to respective ends 121a, 122a and 123a of the windings 121 to 123 exposed from the lid member 15. The other ends of the cores of the windings 121 to 123 are respectively crimped to the first to third connecting terminals 41 to 43. The first to third conductor wires 21 to 23 are bent at several points between the two ends. Then, the bent state of the first to third conductor wires 21 to 23 is maintained by the stiffness thereof.

Since the first to third conductor wires 21 to 23 are held by the holding member 3, it is easy to connect the first to third conductor wires 21 to 23 to the windings 121 to 123 and to fix the first to third connecting terminals 41 to 43 to the terminal block 5. In addition, for example, sympathetic vibration of the first to third conductor wires 21 to 23 due to vibration generated during rotation of the three-phase motor 10 is also reduced. The effect of reducing the sympathetic vibration is remarkable on the first conductor wire 21 which is the longest of the first to third conductor wires 21 to 23.

The holding member 3 is formed by molding and partially covers the first to third conductor wires 21 to 23 in the longitudinal direction. In the molding process, the first to third conductor wires 21 to 23 are placed so that straight portions thereof are partially located in a mold for resin molding, and molten resin is injected into the mold and is solidified. The holding member 3 is thereby formed and the first to third conductor wires 21 to 23 are held by the holding member 3. In the first embodiment, the holding member 3 is formed in a bar shape curving along a circumferential direction of the stator 12 and has a rectangular shape in a cross section perpendicular to the circumferential direction. The holding member 3 is formed of a resin, e.g., PPS (polyphenylene sulfide), PA (polyamide), PBT (polybutylene terephthalate), etc.

Figure 4:
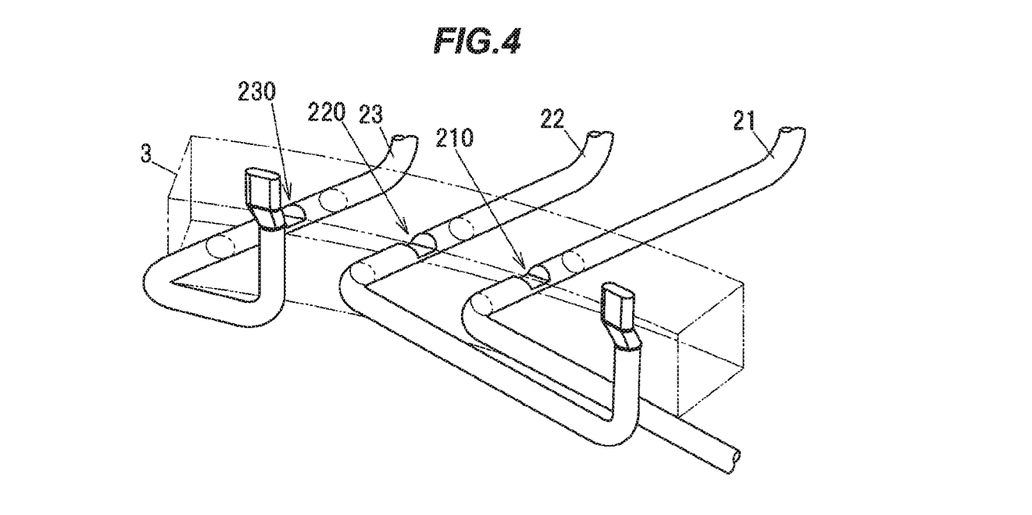
FIG. 4 is an explanatory diagram illustrating portions of first to third conductor wires covered with a holding member.

FIG. 4 is an explanatory diagram illustrating portions of the first to third conductor wires 21 to 23 covered with the holding member 3. In FIG. 4, the holding member 3 is indicated by a phantom line (dash-dot-dot line).

Each of the first to third conductor wires 21 to 23 has one recessed portion 210, 220, 230 at a portion covered with the holding member 3. The recessed portions 210, 220 and 230 are formed on the portions of the first to third conductor wires 21 to 23 covered with the holding member 3 and are not exposed to the outside of the holding member 3. The portions of the first to third conductor wires 21 to 23 covered with the holding member 3 are straight and parallel to each other.

Figure 5A:
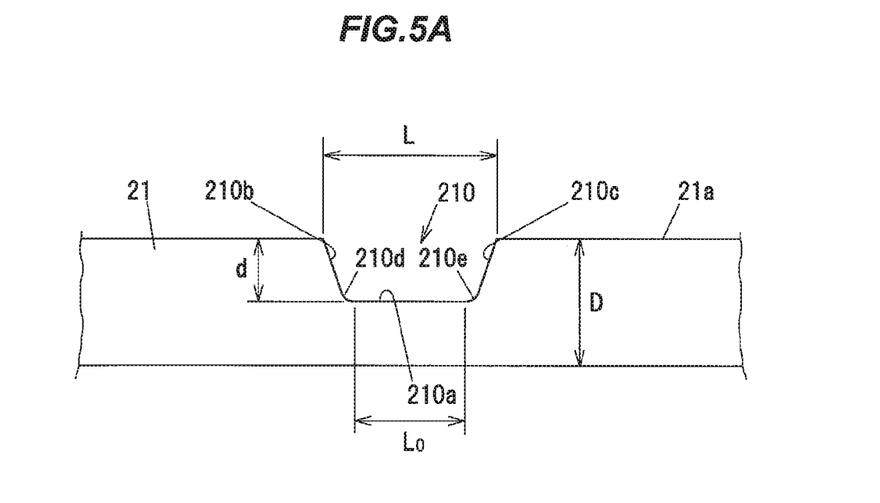
FIG. 5A is an enlarged view showing the vicinity of a recessed portion of the first conductor wire before being covered with the holding member.
Figure 5B:
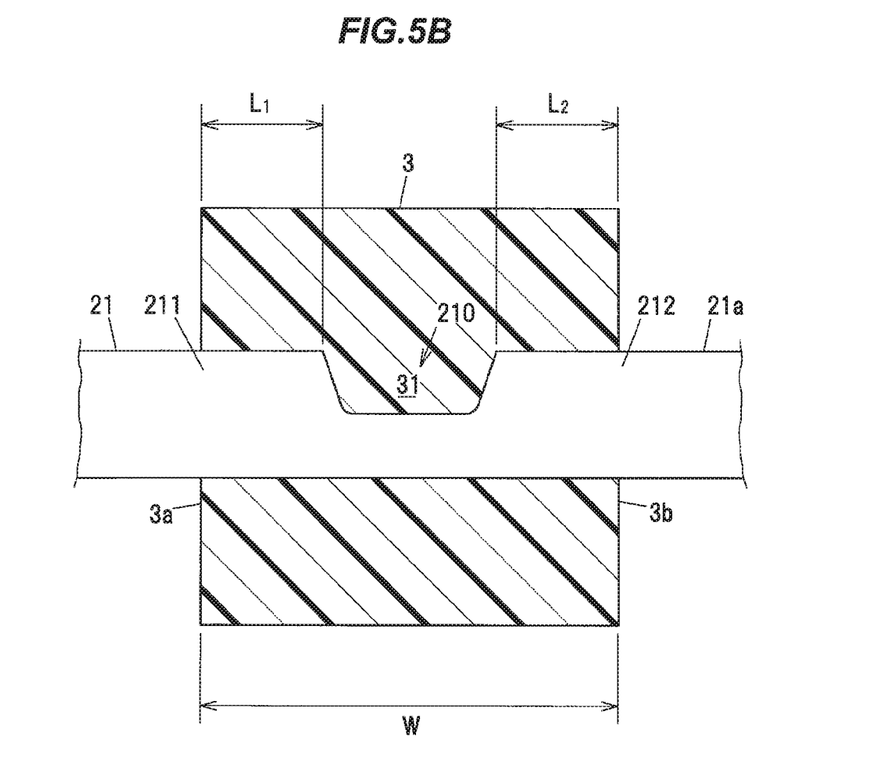
FIG. 5B is an enlarged view showing the vicinity of the recessed portion of the first conductor wire covered with the holding member.

FIG. 5A is an enlarged view showing the vicinity of the recessed portion 210 of the first conductor wire 21 before being covered with the holding member 3. FIG. 5B is an enlarged view showing the vicinity of the recessed portion 210 of the first conductor wire 21 covered with the holding member 3. The recessed portions 220 and 230 of the second and third conductor wires 22 and 23 are also formed in the same manner as the recessed portion 210 of the first conductor wire 21.

The recessed portion 210 has a flat bottom surface 210a extending along the longitudinal direction of the first conductor wire 21, a pair of side surfaces 210b, 210c facing each other in the longitudinal direction of the first conductor wire 21 across the bottom surface 210a, and curved portions 210d and 210e formed respectively at joining points between the bottom surface 210a and the pair of side surfaces 210b, 210c. As shown in FIG. 5A, when the recessed portion 210 is viewed in a direction perpendicular to the longitudinal direction of the first conductor wire 21 as well as parallel to the bottom surface 210a, the curved portions 210d and 210e have an arc shape and the entire recessed portion 210 has a bathtub shape.

In the first embodiment, an angle formed between the bottom surface 210a and each of the pair of side surfaces 210b, 210c is an obtuse angle, and a distance between the pair of side surfaces 210b, 210e increases with increasing distance from the bottom surface 210a along a radial direction of the first conductor wire 21. To form the recessed portion 210, for example, a tool with a raised portion having a shape corresponding to the recessed portion 210 is used and the first conductor wire 21 is plastically deformed by pressing the tool against an outer circumferential surface 21a of the first conductor wire 21. However, it is not limited thereto, and the recessed portion 210 may be formed by shaving away a portion of the first conductor wire 21. Forming the recessed portion 210 in this manner does not produce any burr-shaped piece protruding from the outer circumferential surface 21a of the first conductor wire 21 at a portion where the recessed portion 210 is not formed, thereby preventing such a problem that a burr-shaped protrusion is separated from the first conductor wire 21 at the time of molding and remains inside the holding member 3.

When the holding member 3 is molded, a portion of molten resin gets in the recessed portion 210 and is formed into an engagement portion 31 which prevents the first conductor wire 21 from coming off. In other words, the first conductor wire 21 is restricted from moving in the longitudinal direction relative to the holding member 3 by engagement between the recessed portion 210 and the engagement portion 31 as a portion of the holding member 3 located therein.

As shown in FIG. 5A, a depth d of the recessed portion 210 along the radial direction of the first conductor wire 21 is desirably not less than 5% and less than 50% of a diameter D of the first conductor wire 21. This is because the effect of preventing the first conductor wire 21 from coming off is reduced when the depth d of the recessed portion 210 is less than 5% of the diameter D of the first conductor wire 21, while the cross-sectional area at a portion having the recessed portion 210 is too small and an electric current flowing through the first conductor wire 21 is likely to be concentrated at such portion and generate heat when the depth d of the recessed portion 210 is not less than 50% of the diameter D of the first conductor wire 21. Adjusting the depth d of the recessed portion 210 to less than 50% of the diameter D of the first conductor wire 21 can also prevent the first conductor wire 21 from being snapped at the recessed portion 210 due to resin pressure during molding to form the holding member 3.

A length L of the recessed portion 210 in the longitudinal direction of the first conductor wire 21 is desirably not less than 5% of the diameter D of the first conductor wire 21. This is because the effect of preventing the first conductor wire 21 from coming off is reduced when the length L of the recessed portion 210 is less than 5% of the diameter D of the first conductor wire 21. Desirably, the length L of the recessed portion 210 is also not less than 0.5 mm. This is because a sufficient amount of the molten resin may not get in the recessed portion 210 at time of molding when the length L of the recessed portion 210 is less than 0.5 mm.

In the first embodiment, a length Lo (length in the longitudinal direction of the first conductor wire 21) of the bottom surface 210a of the recessed portion 210 is also not less than 5% of the diameter D of the first conductor wire 21 and is not less than 0.5 mm. In addition, in the first embodiment, the length L of the recessed portion 210 is greater than the diameter D of the first conductor wire 21.

There is no specific upper limit for the length L of the recessed portion 210 as long as it is less than a width W of the holding member 3 along the longitudinal direction of the first conductor wire 21 (see FIG. 5B). However, even when the width of the holding member 3 is large, the length L is desirably e.g., less than 5 times (less than 500% of) the diameter D of the first conductor wire 21. This is because when the length L of the recessed portion 210 is too long, the first conductor wire 21 has a small cross-sectional area in a larger range, which causes an increase in electrical resistance.

In addition, the first conductor wire 21 has exposed portions 211 and 212 exposed from the holding portion 3 as shown in FIG. 5B, and lengths $L_1$ and $L_2$ between the exposed portions 211/212 and the recessed portion 210 in the longitudinal direction of the first conductor wire 21 are both desirably not less than 0.5 nm. This is because a portion of the first conductor wire 21 within a range of less than 0.5 mm from the recessed portion 210 along the longitudinal direction of the first conductor wire 21 may have less roundness due to external force applied at the time of forming the recessed portion 210 and the first conductor wire 21 may not be reliably gripped and held between upper and lower molds of the mold. Adjusting $L_1$ and $L_2$ to not less than 0.5 mm can also prevent the first conductor wire 21 from being snapped at the recessed portion 210 due to vibration generated during rotation of the three-phase motor 10 or vibration of the vehicle.

In view of further preventing the first conductor wire 21 from being snapped at the recessed portion 210 due to vibration generated during rotation of the three-phase motor 10 or vibration of the vehicle, $L_1$ and $L_2$ of not less than 1.0 mm is more preferable. On the other hand, by adjusting $L_1$ and $L_2$ to not less than 10.0 mm, it is possible to prevent an increase in the size of the holding member 3.

In this regard, when exit surfaces 3a and 3b of the holding member 3 from which the first conductor wire 21 exits are not perpendicular to the longitudinal direction of the first conductor wire 21, the lengths $L_1$ and $L_2$ are the minimum distance from the portion having the recessed portion 210 to the exit surfaces 3a and 3b.

(Functions and Effects of the First Embodiment)

In the first embodiment, it is possible to prevent the first to third conductor wires 21 to 23 from moving along the longitudinal direction thereof relative to the holding member 3.

Second Embodiment

Next, the second embodiment of the invention will be described in reference to FIGS. 6A and 6B. While the first conductor wire 21 having one recessed portion 210 has been described in the first embodiment, the first conductor wire 21 in the second embodiment has plural (two) recessed portions 210 at a portion covered with the holding member 3. The second and third conductor wires 22 and 23 also respectively have plural recessed portions 220, 230 even though it is not shown in the drawings.

Figure 6A:
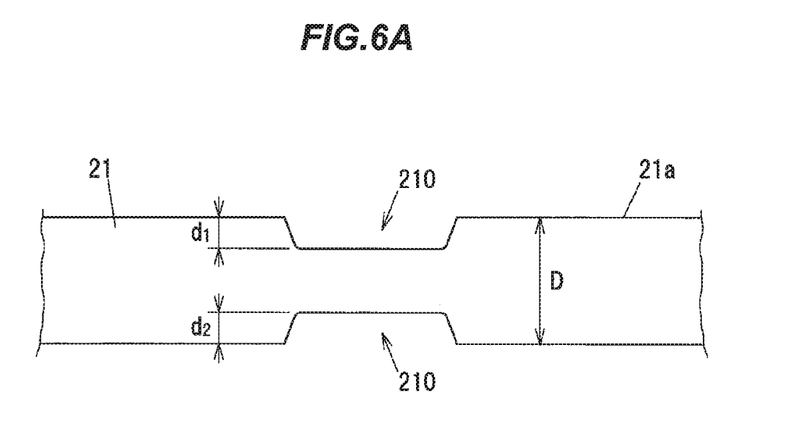
FIG. 6A is an enlarged view showing the vicinity of two recessed portions of the first conductor wire before being covered with the holding member and FIG. 6B is an enlarged view showing the vicinity of the two recessed portions of the first conductor wire covered with the holding member.
Figure 6B:
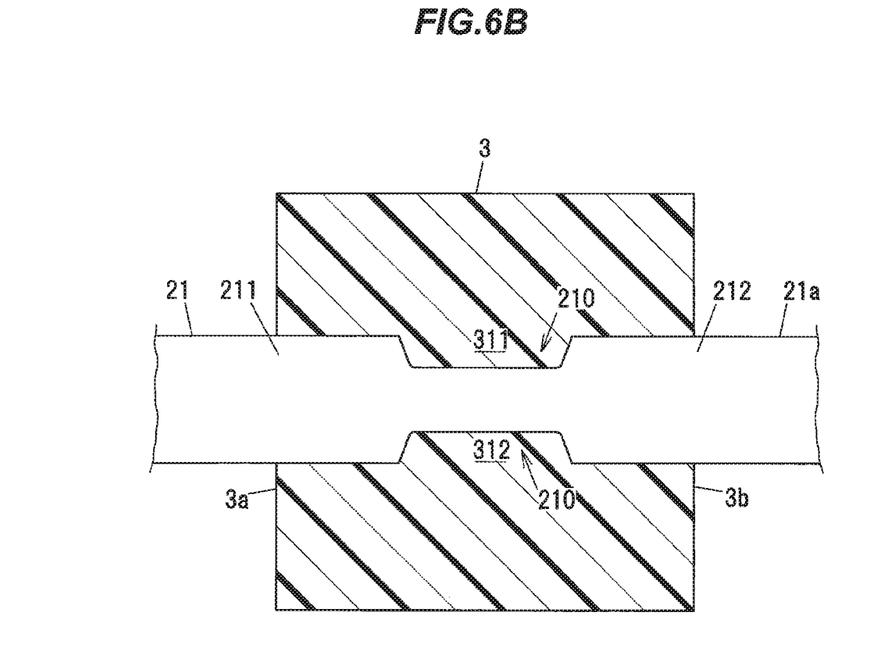

FIG. 6A is an enlarged view showing the vicinity of the two recessed portions 210 formed on the first conductor wire 21 before being covered with the holding member 3. FIG. 6B is an enlarged view showing the vicinity of the two recessed portions 210 of the first conductor wire 21 covered with the holding member 3. In FIGS. 6A and 6B, the same constituent elements as those of the first embodiment are denoted by the same reference numerals as those in FIGS. 5A and 5B, and the overlapping explanation will be omitted.

Engagement portions 311 and 312 formed during molding to form the holding member 3 are located in the two recessed portions 210 of the first conductor wire 21 and prevent the first conductor wire 21 from coming out. Each recessed portion 210 has the same bathtub shape as that described in reference to FIG. 5A.

The two recessed portions 210 are formed at the same position in the longitudinal direction of the first conductor wire 21. Such two recessed portions 210 can be easily formed by, e.g., using a tool with two raised portions having a shape corresponding to the respective recessed portions 210 and pinching the first conductor wire 21 in the radial direction between the two raised portions.

Where depths of the two recessed portions 210 along the radial direction of the first conductor wire 21 are defined as $d_1$ and $d_2$ as shown in FIG. 6A, the sum $d_3$ of the depths $d_1$ and $d_2$ ($=d_1+d_2$) is desirably not less than 5% and less than 50% of the diameter D of the first conductor wire 21. This is because the effect of preventing the first conductor wire 21 from coming off is reduced when the sum $d_3$ is less than 5% of the diameter D of the first conductor wire 21, while the cross-sectional area at a portion having the recessed portions 210 is too small and an electric current flowing through the first conductor wire 21 is likely to be concentrated at such portion and generate heat when the sum $d_3$ is not less than 50% of the diameter D of the first conductor wire 21.

The same functions and effects as those in the first embodiment are also obtained in the second embodiment.

SUMMARY OF THE EMBODIMENTS

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A wiring component (1), comprising: a conductive wire (21) comprising a single wire; and a holding member (3) that covers a part of the conductive wire (21) in a longitudinal direction to hold the conductive wire (21), wherein the conductive wire (21) comprises at least one recessed portion (210) formed on the covered part thereof, and the conductive wire (21) is prevented from longitudinally moving relative to the holding member (3) by an engagement between the recessed portion (210) and a portion (31/311, 312) of the holding member (3) filled in the recessed portion (210).

[2] The wiring component (1) according to [1], wherein the conductive wire (21) comprises a single one of the recessed portion (210) on the covered part, and a depth (d) of the recessed portion (210) is not less than 5% and less than 50% of a diameter (D) of the conductive wire (21).

[3] The wiring component (1) according to [1], the conductive wire (21) comprises plural ones of the recessed portion (210) on the covered part, and the sum of respective depths ($d_1$, $d_2$) of the plural recessed portions (210) is not less than 5% and less than 50% of a diameter of the conductive wire (21).

[4] The wiring component (1) according to any one of [1] to [3], wherein the recessed portion (210) is configured such that a length (L) thereof in the longitudinal direction is not less than 5% of a diameter of the conductive wire (21).

[5] The wiring component (1) according to any one of [1] to [4], wherein the conductive wire (21) is configured such that a distance between an exposed portion (211, 212) exposed from the holding member (3) and the recessed portion (210) is not less than 0.5 mm.

[6] The wiring component (1) according to any one of [1] to [4], wherein the recessed portion (210) comprises a flat bottom surface (210a) extending along the longitudinal direction, a pair of side surfaces (210b, 210c) facing each other in the longitudinal direction across the bottom surface (210a), and curved portions (210d, 210e) formed respectively at joining points between the bottom surface (210a) and the pair of side surfaces (210b, 210c).

Although the embodiments of the invention have been described, the invention according to claims is not to be limited to the embodiments described above. Further, please note that all combinations of the features described in the embodiments are not necessary to solve the problem of the invention.

In addition, the invention can be appropriately modified and implemented without departing from the gist of the present invention. For example, although the holding member 3 holding the first to third conductor wires 21 to 23 has been described in the embodiments, it is not limited thereto. The holding member 3 may hold only the conductor wire 21.

In addition, although the wiring component 1 used to connect the ends of the windings 121 to 123 of the three-phase motor 10 to the terminal block 5 has been described in the embodiments, the intended use of the wiring component 1 is not limited thereto.

Furthermore, although the holding member 3 formed by solidifying molten resin has been described in the embodiments, the holding member 3 may be formed by solidifying molten metal.

Furthermore, the example in which the holding member 3 is not fixed to a motor (the three-phase motor 10) is shown in the embodiments (especially FIG. 2), the holding member 3 may be fixed to the motor (the three-phase motor 10). Still further, it is not limited thereto, and the holding member 3 may be fixed to a member other than the motor (the three-phase motor 10), such as vehicle body.

The invention claimed is:

1. A wiring component, comprising: a plurality of conductive wire wires each comprising a single wire; and a holding member that comprises a mold resin and covers a part of the plurality of conductive wire wires in a longitudinal direction to hold the plurality of conductive wire wires, wherein each of the plurality of conductive wire wires comprises at least a single one recessed portion formed on the covered part thereof and a depth of the recessed portion is not less than 5% and less than 50% of a diameter of the conductive wire, and wherein the conductive wire is prevented from longitudinally moving relative to the holding member by an engagement between the recessed portion and a portion of the holding member filled in the recessed portion, and wherein the mold resin is filled in an entire portion of the recessed portion; wherein the recessed portion is configured such that a length thereof in the longitudinal direction is not less than 5% of a diameter of the conductive wire.

2. A wiring component, comprising: a plurality of conductive wires each comprising a single wire; and a holding member that comprises a mold resin and covers a part of the plurality of conductive wires in a longitudinal direction to hold the plurality of conductive wires, wherein each of the plurality of conductive wires comprises plural recessed portions formed on the covered part thereof, and the sum of respective depths of the plural recessed portions is not less than 5% and less than 50% of a diameter of the conductive wire, wherein the conductive wire is prevented from longitudinally moving relative to the holding member by an engagement between the plural recessed portions and a portion of the holding member filled in the plural recessed portions, and wherein the mold resin is filled in an entire portion of each of the plural recessed portions; wherein the recessed portion is configured such that a length thereof in the longitudinal direction is not less than 5% of a diameter of the conductive wire.

3. The wiring component according to claim 1, wherein the conductive wire is configured such that a distance between an exposed portion exposed from the holding member and the recessed portion is not less than 0.5 mm.

4. The wiring component according to claim 1, wherein the recessed portion comprises a flat bottom surface extending along the longitudinal direction, a pair of side surfaces facing each other in the longitudinal direction across the bottom surface, and curved portions formed respectively at joining points between the bottom surface and the pair of side surfaces.

5. The wiring component according to claim 2, wherein the conductive wire is configured such that a distance between an exposed portion exposed from the holding member and the recessed portion is not less than 0.5 mm.

6. The wiring component according to claim 2, wherein the recessed portion comprises a flat bottom surface extending along the longitudinal direction, a pair of side surfaces facing each other in the longitudinal direction across the bottom surface, and curved portions formed respectively at joining points between the bottom surface and the pair of side surfaces.

7. The wiring component according to claim 1, wherein the holding member is a one-piece construction.

8. The wiring component according to claim 2, wherein the holding member is a one-piece construction.

* * * * *